US006827538B2

(12) United States Patent
Doppke et al.

(10) Patent No.: US 6,827,538 B2
(45) Date of Patent: Dec. 7, 2004

(54) TORQUE PREVAILING STUD

(75) Inventors: Thomas S. Doppke, Sterling-Heights, MI (US); Bruce D. Whitman, Lorain, OH (US); Robert Schmidt, Petoskey, MI (US)

(73) Assignee: HTG-Wyandotte, LLC, Wyandotte, MI (US)

( * ) Notice: Subject to any disclaimer, the term of this patent is extended or adjusted under 35 U.S.C. 154(b) by 0 days.

(21) Appl. No.: 10/237,576

(22) Filed: Sep. 9, 2002

(65) Prior Publication Data
US 2003/0072633 A1 Apr. 17, 2003

Related U.S. Application Data

(60) Provisional application No. 60/317,977, filed on Sep. 10, 2001.

(51) Int. Cl.[7] ................................................. F16B 35/00
(52) U.S. Cl. ......................... 411/389; 411/311; 411/938
(58) Field of Search ............................. 411/1, 309, 310, 411/311, 389, 938

(56) References Cited

U.S. PATENT DOCUMENTS

| 930,450 | A | | 8/1909 | Zinow |
|---|---|---|---|---|
| 1,172,427 | A | | 2/1916 | Carlson |
| 1,389,927 | A | | 9/1921 | Ball |
| 1,884,973 | A | | 10/1932 | Hoke |
| 2,202,240 | A | | 5/1940 | Trotter |
| 2,352,540 | A | | 6/1944 | Hanneman |
| 2,371,365 | A | * | 3/1945 | Tomalis et al. ............. 411/310 |
| 2,407,741 | A | * | 9/1946 | Goodby ....................... 411/311 |
| 2,596,885 | A | | 5/1952 | Booth .......................... 287/125 |
| 2,713,882 | A | | 7/1955 | Wilkes |
| 2,897,867 | A | | 8/1959 | Torre |
| 2,923,339 | A | | 2/1960 | Skidmore |
| 3,076,208 | A | * | 2/1963 | Moore ..................... 411/311 X |
| 3,381,733 | A | * | 5/1968 | Stanwick ...................... 411/311 |
| 3,408,887 | A | | 11/1968 | Villo ............................. 83/140 |
| 3,464,306 | A | | 9/1969 | Reynolds et al. |
| 3,504,722 | A | | 4/1970 | Breed |
| 3,523,565 | A | | 8/1970 | Olsen |
| 3,603,132 | A | | 9/1971 | Holmes ......................... 72/402 |
| 3,664,400 | A | * | 5/1972 | Moore ..................... 411/938 X |
| 3,763,725 | A | | 10/1973 | Reiland ..................... 81/121 R |
| 3,792,933 | A | | 2/1974 | Stencel .......................... 403/19 |
| 3,841,371 | A | | 10/1974 | Thurston |
| 3,854,372 | A | | 12/1974 | Gutshall |
| 3,878,759 | A | | 4/1975 | Carlson |

(List continued on next page.)

FOREIGN PATENT DOCUMENTS

GB      2198801    *   6/1988  ................ 411/311

OTHER PUBLICATIONS

Barrett Engineering Consulting, Fastener Design Manual, Part One. 13 pages. http://www.tcnj.edu/~rgraham/barrett/manual1–A.html. Oct. 16, 2000.

Vibration Loosening of Bolts and Threaded Fasteners. 3 pages. http://www.boltscience.com/pages/vibloose.htm Oct. 16, 2000.

Primary Examiner—Neill Wilson
(74) Attorney, Agent, or Firm—Young & Basile, P.C.

(57) ABSTRACT

A torque prevailing stud having a male component made of a shank with an outer wall that is threaded, a gripping component formed on the shank, and a wedge ramp rolled in a portion of the threaded outer wall. A female component having a body with a threaded bore that is used for engaging the male component. The threaded bore of the female component matingly engages a portion of the threaded outer wall and the wedge ramp when screwed thereon. The wedge ramp forces the threaded bore to conform to the shape of the wedge ramp thereby securing the male and female components together in a torque prevailing fit.

16 Claims, 3 Drawing Sheets

U.S. PATENT DOCUMENTS

| | | | |
|---|---|---|---|
| 4,005,740 A | | 2/1977 | Villo, deceased et al. |
| 4,015,504 A | * | 4/1977 | Rosan, Sr. et al. .......... 411/389 |
| 4,061,367 A | | 12/1977 | Moebius .................. 285/382.2 |
| 4,074,011 A | | 2/1978 | Teramae et al. ............ 428/422 |
| 4,260,005 A | | 4/1981 | Stencel .......................... 411/3 |
| 4,383,353 A | | 5/1983 | Stencel ........................ 29/517 |
| 4,544,312 A | | 10/1985 | Stencel .......................... 411/3 |
| 4,854,311 A | * | 8/1989 | Steffee .................. 411/389 X |
| 4,928,531 A | * | 5/1990 | Schult et al. ........... 411/389 X |
| 4,934,491 A | | 6/1990 | Yamaoka et al. ...... 188/322.15 |
| 4,973,209 A | | 11/1990 | Essom et al. ............... 411/386 |
| 5,071,301 A | | 12/1991 | Engelhardt et al. ......... 411/389 |
| 5,242,252 A | | 9/1993 | Harle ........................ 411/311 |
| 5,340,254 A | | 8/1994 | Hertel et al. ................ 411/311 |
| 6,135,689 A | | 10/2000 | Matsunami ................. 411/311 |
| 2002/0131834 A1 | | 9/2002 | Kondo et al. ............... 411/308 |

* cited by examiner

TORQUE PREVAILING STUD

RELATED APPLICATIONS

This application claims the benefit of U.S. Provisional Application Ser. No. 60/317,977 filed Sep. 10, 2001 hereby incorporated by reference in its entirety.

BACKGROUND OF THE INVENTION

This invention relates generally to a threaded connecting apparatus such as a combination of nuts and bolts, and more particularly to a torque prevailing stud.

Threaded fastening systems are commonly used today to join two separate elements together either permanently or temporarily. Such fastening systems provide the opportunity to strongly, yet removably fasten one element with another. However, most current threaded fastening systems are subject to undesired stresses or forces that may cause the threaded connection to unscrew itself, thereby weakening the integrity of the underlying connection.

In the automotive industry, a common use of such threaded fastening systems is for attaching exhaust flanges to manifolds on automobiles. In this case, one end of the stud is attached to a manifold flange and the other end of the stud is attached to an exhaust flange. Such fastening systems are subjected to extreme forces from a variety of sources such as axial forces caused by the vibration of the manifold on a vehicle. They are also vulnerable to vibration from the movement of the vehicle itself, all such forces being capable of causing the nuts or female components of the threaded connections to slowly unscrew themselves.

In order to securely maintain the removable connection of two separate elements, a torque prevailing stud has been developed to prevent the threaded connection from vibrating loose. The stud is comprised of a male component made of a shank with an outer wall that is threaded and has a wedge ramp formed in a portion of the threaded outer wall. The stud also has a gripping component located along the shank of the male component. A separate female component is necessary to attach objects to the shank of the male component. The female component has a threaded central bore that matingly engages the threaded outer wall of the male component in such a manner as to cause the wedge ramp to lock the threaded outer wall of the male component within the threaded bore of the female component and prevent undesired loosening of the fastening system.

SUMMARY OF THE INVENTION

It is an object of the present invention to provide a threaded fastening system that is torque resistant.

The object of the present invention is achieved by a torque prevailing stud comprised of a male component made of a shank with an outer wall that is threaded and a wedge ramp formed in a portion of the threaded outer wall. The stud also has a gripping component that is located within the central region of the shank and is used to facilitate securing the stud to another component.

A female component having a body with a threaded bore for engaging the male component is used to facilitate connecting other elements to the stud. The threaded bore of the female component matingly engages the threaded outer wall of the male component. When the wedge ramp portion of the male component is introduced into the female component, the wedge of each thread engages the adjacent faces of the female component causing a tight frictional fit therewith that is resistive to vibratory jarring which normally causes the fastening system to loosen.

While the wedge ramp creates a secure, locking fit between the male and female components of the torque prevailing stud, the female component is still capable of being removed from the male component with normal means such as a wrench or pliers. Thus the torque prevailing stud is effective at securing various elements together, yet removable and reusable.

Other objects, advantages and novel features of the invention will become more apparent from the following detailed description of the invention when taken in conjunction with the accompanying drawings.

DETAILED DESCRIPTION OF THE INVENTION

Figure 1:
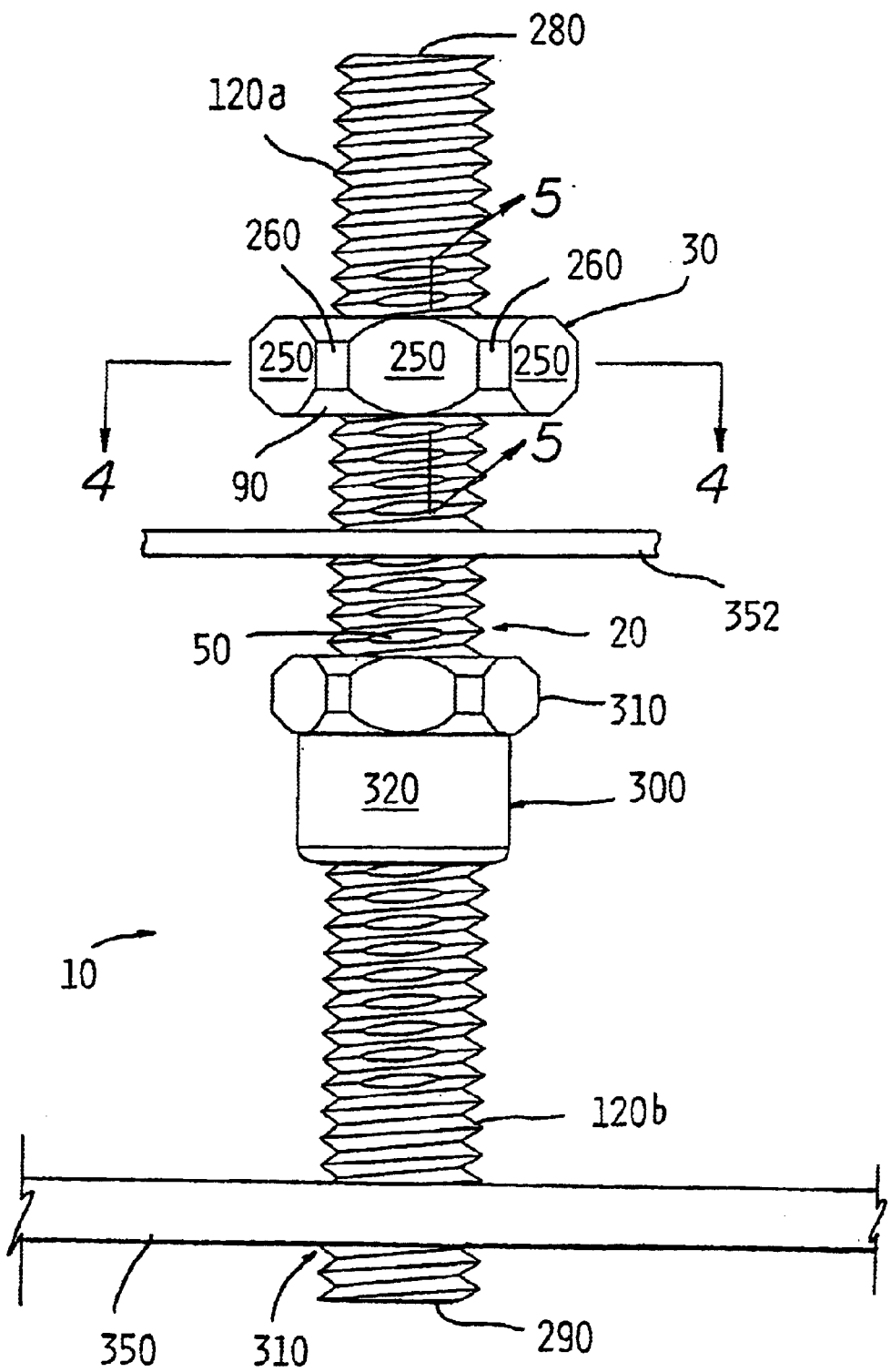
FIG. 1 is a front elevational view of the torque prevailing stud of the present invention showing the stud, a portion of a connecting element, and female component.

The torque prevailing stud 10, as shown in elevation in FIG. 1, has a male component 20 with a gripping component 300 integrally formed therewith as a single piece. Gripping component 300 includes a hexagonal crown portion 310 consisting of hexagonally arrayed flats 330 interconnected by bridge flats 340 and a cylindrical crown wall portion 320 abutting and underlying crown portion in 310.

Figure 2:
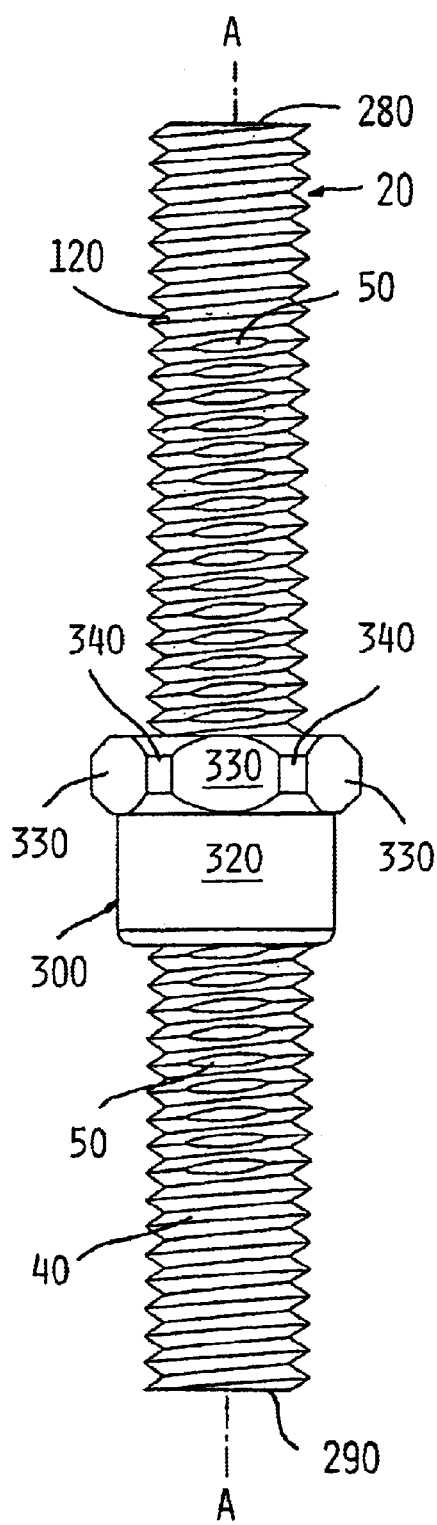
FIG. 2 is a front elevational view of the torque prevailing stud.
Figure 3:
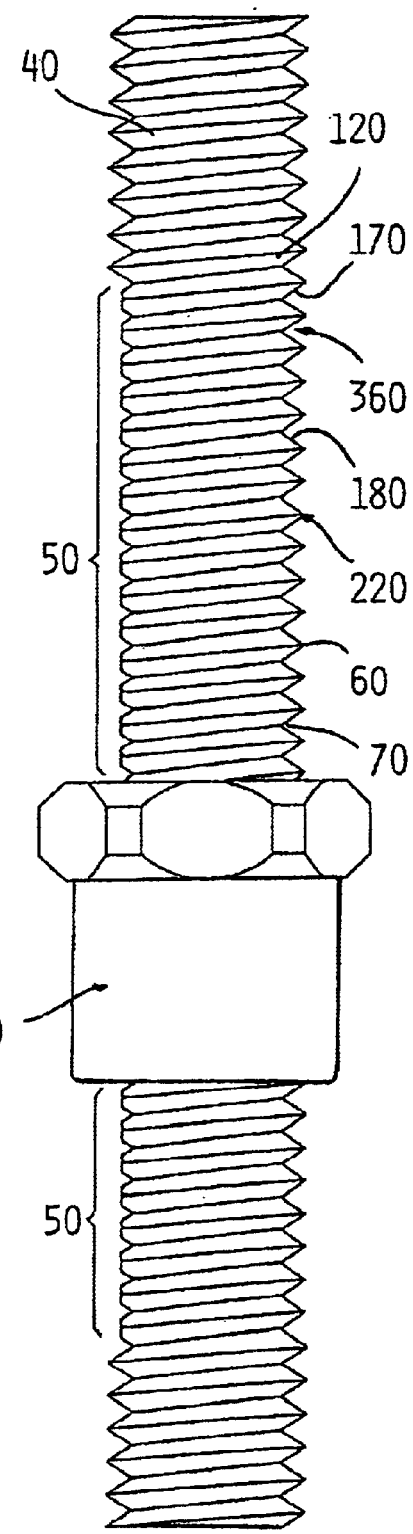
FIG. 3 is a side elevational view of the torque prevailing stud.

As shown in FIGS. 2 & 3, the male component 20 has a shank 120 with an outer wall 160 (FIG. 4) that is threaded with a plurality of threads 40 and a wedge ramp 50 formed in the outer perimeter of the threaded outer wall 160. The male component 20 is similar to that of a conventional nut or a stud, and has the gripping component 300 formed in the central region of the shank 120 thereby facilitating the process of connecting the torque prevailing stud 10 to another component such as the manifold flange 350. Gripping component 300 will be seen to be positioned between a threaded first shank end portion 120a and a threaded second shank end portion 120b. The diameters of the first and second shank end portions are identical and the threads of the first and second end portions are also identical.

The wedge ramp 50 extends on both sides of the gripping component 300 providing torque resistance to both the element thereto and the stud 10 itself.

Cylindrical crown wall portion 320 has an axial length exceeding the axial length of hexagonal crown portion 310 and diameter less than the effective diameter of hexagonal crown portion 310 and greater than the diameter of shank 120.

Figure 4:
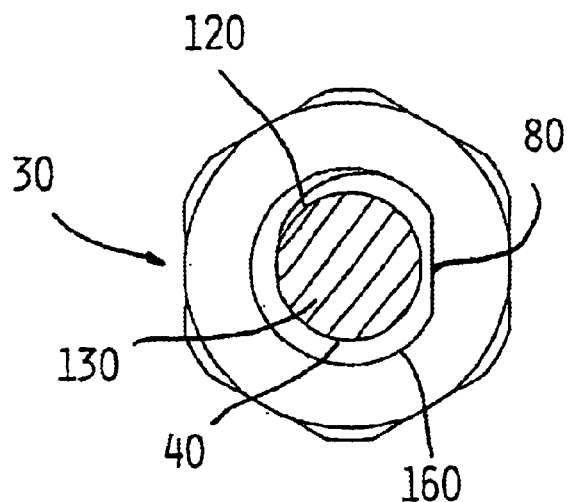
FIG. 4 is a cross-sectional view of the male component and the gripping component of the stud taken along line 4—4 in FIG. 1.

The shank 120 of the male component 20 may have a hollow or solid core 130, as shown in FIG. 4. The wedge ramp 50 is formed in a portion of the outer threads 40 and is comprised of each adjacent thread 40 having outermost tip 220 rolled down to form a substantially flat surface 80 (FIGS. 3 & 4). In the preferred embodiment, the rolled portion is only on one side or it extends around only a portion of the perimeter of the shank 120. However, it is foreseeable that the wedge ramp 50 can extend around the entire perimeter of the shank 120 or a plurality of wedge ramps 50 can be spaced around the perimeter of the shank 120.

The male component 20 may be treated with plating processes or coating processes to inhibit corrosion, galling and embrittlement. Such plating and coating of all of the components of the stud fastening system facilitate a frictional fit between the various components and prevent loosening of the connection or failure thereof.

The actual length of the male component 20 may vary as may the length of the wedge ramp 50. However, the length of the wedge ramp 50 must be less than the length of the male component 20 thereby providing an unencumbered portion of threaded shank 120 at each end 280,290 of the male component 20. The first few threads 40 at the second end 290 allow the shank 120 to be screwed into an element on the vehicle such as the manifold flange 350. The threads 40 that are not rolled, provide for the stud 10 to be started within a threaded bore on the manifold flange 350 or other element, and threaded a short portion prior to engagement of the wedge ramp 50 making the screwing process easier to initiate. The first few threads 40 at the second end 290 of the shank 120 allow the stud 10 to be partially screwed into a connecting component with relative ease prior to the engagement of the wedge ramp 50.

Figure 5:
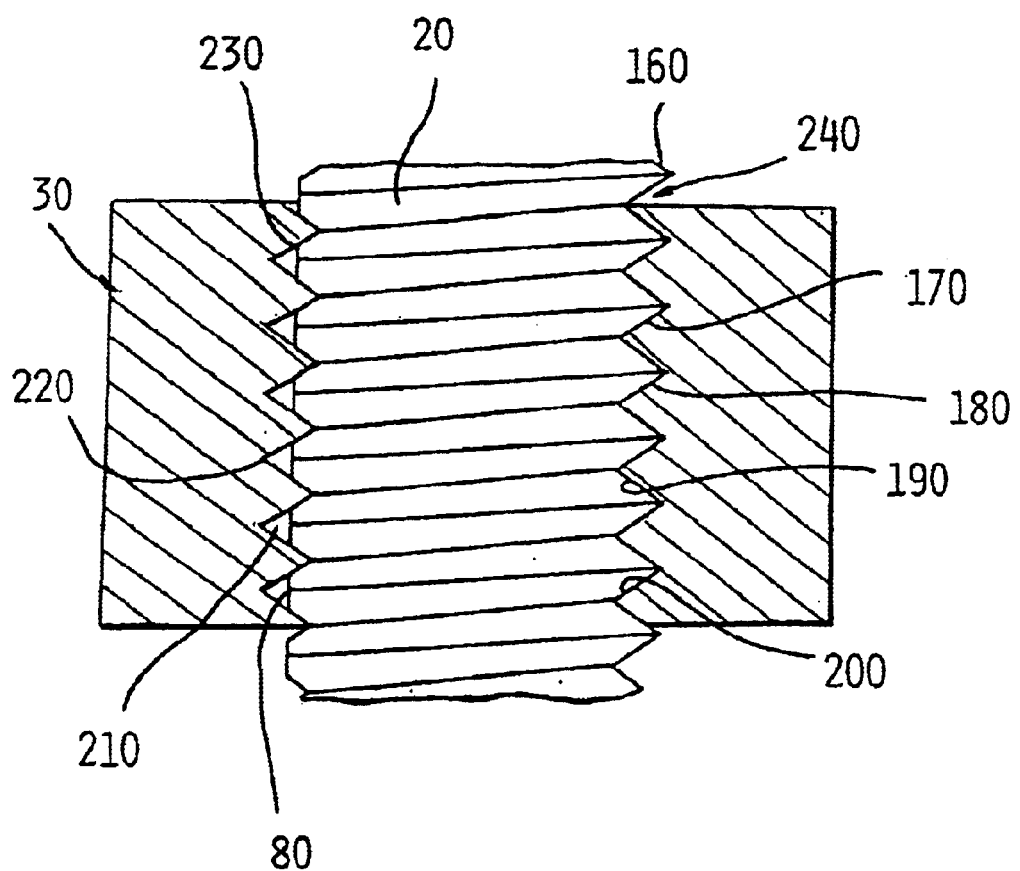
FIG. 5 is a cross-sectional view of the torque prevailing stud taken along line 5—5 in FIG. 1, showing the threads of the male component with a female component tightened onto the wedge ramp of the male component.

The thread 40 of the male component 20 is comprised of a series of adjacent faces 170,180 that create a root 70 at their interior end and a crest 60 at their exterior end with a V-shaped channel 360 in between. See FIG. 3. When the wedge ramp 50 is formed, the crests 60 of the threads 40 are rolled down forming a substantially flat surface 80. As the threads 40 are rolled, they are compacted slightly widening the cross-section thereof narrowing the width of the channels 360 therebetween as shown in FIG. 5. The widening of the threads 40 of the rolled portion or wedge ramp 50 forces the threads in the threaded bore 240 of the female component 30 to be displaced when the female component 30 is screwed onto the torque prevailing stud. This widening action creates a physical bulking of the stud threads 40 within the threaded bore 240 creating resistance to the off-torque forces associated with the vibration of the manifold when the engine of an automobile is on. The expanded nature of the threads 40 creates a snug fit within the mating flanking faces 190,200 of the threaded bore 240 thus preventing the female component to work itself free of the male component 20. The same concept applies to securing the stud 10 to the exhaust flange 352 or other parts of the vehicle.

The female component 30 has a body 90 comprised of a series of adjacent flat surfaces 250,260 that may be of different sizes (FIG. 1). The flat surfaces 250,260 are spaced around the outer perimeter of the body 90 and they provide an angled surface that is easily gripped by convention tools such as ratchets, wrenches or pliers when the female component 30 is screwed on or off the male component 20.

The body 90 of the female component 30 has an internal threaded bore 240 (FIG. 4) for engaging the male component 20. The threaded bore 240 matingly engages the threaded outer wall 160 of the male component 20 in such a manner as to cause the wedge ramp 50 to self-lock the threads 40 of the male component 20 with the threaded bore 240 of the female component 30. The expanded physical characteristics of the rolled wedge ramp 50 may cause the threaded bore 240 to conform slightly to the shape of the stud 10 thereby preventing any further unnecessary movement between the two components.

The threaded bore 240 is comprised of a series of flanking faces 190,200 that are adjacent one another forming an internal groove 210 with an apex 220 at the point where the two flanking faces 190,200 meet within the body 90 of the female component 30. The contour of the threaded bore 240 is similar to or mirrors the external threaded contour of the male component 20. As the expanded threads 40 of the wedge ramp 50 are fit within the grooves 210 of the threaded bore 240, the grooves 210 expand to accommodate the expanded shape of the thread 40 of the male component 20 causing a snug fit between the two pieces.

More particularly, each flat face 80 of the wedge ramp 50 has a couple of edges 230, one at each end, opposite one another. As a female component 30 is screwed onto a male component 20, each edge 230 is forced into physical engagement with each flanking face 190,200 of the threaded bore 240 of the female component 30. The two edges 230 are both in physical contact as well as frictional contact with the flanking faces 190,200 of the threaded bore 240 forming a substantially self-locking physical and frictional fit within the torque prevailing stud 10.

Each edge 230 may slightly displace the flanking face 190,200 adjacent to it, forcing the female component 30 to physically expand to accommodate each rolled thread of the male component 20. This fit between the male component 20 and the female component 30 thereby securely lock the male component 20 into a position within the threaded bore 240 of the female component 30 that is resistive to the torque that is common in such threaded connections.

A drawback of common nut-bolt type connections is that if the locking apparatus is subjected to vibrations, a relative motion between the female component 30 and the male component 20 occurs, causing an off torque force that rotates the stud loose. The present embodiment prevents such occurrences by rolling the threads 40 of the male component 20 to form a wedge ramp 50 that engages and conforms the threaded bore 240 of the female component 30 to fit its contour and in the process prevents the two components from being susceptible to resulting forces caused by vibration of the manifold.

The same concept applies to the stud 20 as it is connected to the exhaust flange 352 or any other component that is connected with the stud 20. When the wedge ramp 50 of the torque prevailing stud 10 is introduced to any type of opposing threaded bore 310, the threaded bore 310 conforms its shape to match or contour that of the male component 20 thereby tightening the two components together in a manner that is torque prevailing and resistive.

Although a particular embodiment of the present invention has been described in detail herein with reference to the accompanying drawings, it is to be understood that the invention is not limited to this precise embodiment, and variants and modifications may be effected therein by one skilled in the art without departing from the scope or spirit of the invention as defined in the appended claims.

What is claimed is:

1. A torque prevailing stud, comprising:
   an elongated male component having a central shaft with a threaded outer wall, a wedge ramp formed in a portion of said threaded outer wall and opposite ends; and
   a gripping component formed on and as a single piece with said male component intermediate the opposite ends and providing a grip portion to facilitate the connecting of said male component with another component;

said wedge ramp having a plurality of rolled faces, said wedge ramp extending around a portion of the perimeter of said shaft for a length less than that of said shaft;

wherein said shaft and said wedge ramp are capable of being secured within a threaded bore of a separate component in a torque prevailing manner.

2. A torque prevailing stud comprising:

a male component having a central shaft with a threaded outer wall and a wedge ramp formed in a portion of said threaded outer wall;

a gripping component formed on said male component and providing a grip portion to facilitate the connecting of said male component with another component;

said wedge ramp having a plurality of rolled faces, said wedge ramp extending around a portion of the perimeter of said shaft for a length less than that of said shaft;

wherein said shaft and said wedge ramp are capable of being secured within a threaded bore of a separate component in a torque prevailing manner; and said gripping component being comprised of a crown portion and a crown wall and being integrally formed with said male component as a single piece therewith.

3. The torque prevailing stud of claim 2, wherein:

said wedge ramp is located on each end of said male component, said male component has two ends, each end extending on opposite sides of said gripping component.

4. The torque prevailing stud of claim 3 wherein:

the cross-section of each thread in said wedge ramp is wider than the cross-section of each thread of said shank not a part of said wedge ramp.

5. A torque prevailing stud comprising:

a male component having a shank with an outer wall that is threaded at opposite end portions of the shank, a wedge ramp formed in one of the threaded end portions, and a polygonal gripping component formed on and as a single piece with said shank intermediate the threaded opposite ends of the shank;

wherein said wedge ramp causes the threaded bore of a coacting female component to conform to the shape of the wedge ramp thereby making the male component resistive to torque applied thereto due to the vibration of the component on which the stud is connected.

6. The torque prevailing stud according to claim 5 wherein:

said threaded portion of said male component further comprises adjacent faces forming a channel where said adjacent faces intersect within the shank;

a crest is formed where said adjacent faces intersect on the outer perimeter of said shank; and said wedge ramp is comprised of a plurality of sequential crests, each crest having a flat face with edges on the thread of said threaded outer wall, wherein said edges engage the threaded bore of the coacting female component as the female component is screwed onto said male component and force the threads of the threaded bore to slightly alter and thereby conform in shape to that of the threads of the male component.

7. The torque prevailing stud according to claim 6 wherein;

said crest of said male component fits within a groove of the female component such that flanking faces of the female component are in communication with adjacent faces of the male component;

whereby the thread of the female component is slightly deformed adjacent said wedge ramp of said male component providing a physical and frictional fit between said male component and the female component.

8. The Torque prevailing stud according to claim 7 wherein:

said male component and said female component are torque resistant in both directions of rotation when connected together.

9. The torque prevailing stud according to claim 8, wherein:

said wedge ramp is a rolled flat edge on a plurality of sequential crests of threads, said wedge ramp extending partially around the perimeter of said shank of said male component.

10. A torque prevailing stud comprising:

an elongated shank having a threaded outer wall and a wedge ramp formed in a portion of said threaded outer wall;

a polygonal gripping component formed on and as a single piece with said shank and providing a grip portion to facilitate the connecting of said shank with a mating threaded component, the grip portion spaced axially from each end of the shank and the shank threaded from each end of the shank to the grip portion;

said wedge ramp having a series of rolled substantially flat faces with edges located on adjacent threads of said threaded outer wall;

wherein said wedge ramp secures the threaded outer wall of said shank within the threaded bore of the mating component when the mating component is screwed relative to said shank.

11. The torque prevailing stud according to claim 10 wherein:

said ramp is comprised of a series of adjacent rolled faces formed in said threaded outer wall;

wherein edges of said rolled faces may engage flanking faces of a mating internally threaded component and force the flanking faces to change shape in conformance with the same of said wedge ramp thereby providing a torque resistant mating fit between the components.

12. The torque prevailing stud according to claim 11 wherein:

said stud is coated with a coating to prevent corrosion, galling, embrittlement and the like.

13. A stud comprising an elongated shank formed as a single piece and including a threaded first end portion, a threaded second end portion having a diameter corresponding to the diameter of the first end portion and having threads identical to the threads of the first end portion, and a gripping component between the first and second threaded end portions to facilitate wrenching of the stud, the gripping component comprising a polygonal crown portion and a cylindrical crown wall portion underlying the crown portion and having a diameter less than the effective diameter of the polygonal crown portion and greater than the diameter of the shank.

14. A stud according to claim 13 wherein the crests of adjacent threads in one of the end portions are flattened to provide a locking action when the one end portion is threadably coacted with a mating threaded component.

15. A stud according to claim 13 wherein the cylindrical crown wall portion had an axial length exceeding the axial length of the polygonal crown portion.

16. A stud according to claim 13 wherein each threaded end portion extends from the respective end of the stud to the gripping component.

* * * * *